UNITED STATES PATENT OFFICE 2,651,650

MANUFACTURE OF FERRIC DITHIO-CARBAMATES

Charles J. McKone, Charleston, W. Va., assignor to Monsanto Chemical Company, St. Louis, Mo., a corporation of Delaware No Drawing. Application March 21, 1950, Serial No. 151,046

8 Claims. (Cl. 260—439)

This invention relates to a method of making ferric dithiocarbamates. More particularly it relates to a method of manufacturing ferric di-aliphatic dithiocarbamates having improved stability.

In the manufacture of water-insoluble metal salts of dithiocarbamic acids it is customary to add to an aqueous solution of a salt of a dithiocarbamic acid at least a chemically equivalent amount of a water-soluble salt of the metal, the water-insoluble metal dithiocarbamate being precipitated from solution as it is formed in substantially quantitative yields and subsequently filtered off, washed, and dried. However, in the manufacture of ferric salts of di-aliphatic dithiocarbamic acids numerous difficulties have arisen, for example, decomposition or oxidation of the ferric salt during its preparation which for some unknown reason catalyzes further decomposition during subsequent drying operations and particularly during storage. In fact cases of spontaneous combustion of ferric dithiocarbamates causing considerable damage to equipment and injuries to personnel have occurred.

It has been found in accordance with this invention that aliphatic dithiocarbamates of the general formula

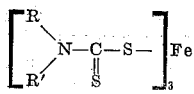

where R and R' are like or unlike aliphatic radicals may be manufactured in an improved physical condition by the addition to an aqueous solution of a salt of an aliphatic dithiocarbamic acid a water-soluble iron salt in a quantity less than the chemically equivalent amount required to precipitate the total dithiocarbamic acid as ferric dithiocarbamate. The ferric di-aliphatic dithiocarbamates so obtained upon undergoing the usual filtration, washing, and drying operations exhibit much greater resistance to decomposition or oxidation than those obtained when at least a chemically equivalent amount of ferric salt precipitant is employed. When as much as a chemically equivalent amount of ferric salt precipitant is employed it has been found that an oxidation potential persists at the end of the reaction and that this condition is detrimental to the stability of the product. While any quantity of iron salt precipitant may be employed which does not persist in giving an oxidation potential as measured by a platinum-saturated calomel electrode, it has been found convenient and satisfactory to employ approximately 90–98% of the chemically equivalent amount of precipitant required.

As exemplary of the invention the following is illustrative and in nowise is to be construed as limitative thereof.

Example 1

To three 10 per cent by weight aqueous solutions of sodium dimethyl dithiocarbamate, respectively, were added the following precipitants in the form of 15 per cent by weight aqueous solutions and the oxidation potential of each system determined with a platinum-saturated calomel electrode.

| Precipitant | Oxidation Potential at End of Reaction |
|---|---|
| (A) Chemically equivalent amount of Fe₂(SO₄)₃. | 25–50 millivolts. |
| (B) 96% of the chemically equivalent amount of Fe₂(SO₄)₃. | none. |
| (C) 10% excess of the chemically equivalent amount of Fe₂(SO₄)₃. | 390 millivolts. |

Example 2

To a suitable reaction vessel containing 9440 parts by weight of a 10 per cent aqueous solution of sodium dimethyl dithiocarbamate (substantially 6.5 molecular proportions) was added gradually with constant agitation over a period of one hour a 22 per cent aqueous solution containing 523 parts by weight (substantially 92% of the chemically equivalent amount) of Fe₂(SO₄)₃.6.83 H₂O. Upon completion of the iron salt addition the agitation was continued for a short period and subsequently the ferric dimethyl dithiocarbamate was filtered off and washed free of sulfates. The addition of a small amount of ferric sulfate to the filtrate confirmed that an excess of sodium dimethyl dithiocarbamate had been employed. The filtered and water washed ferric dithiocarbamate precipitate was dried at 50° C. for about 18 hours. Thereupon a 10.00 gram sample of the dried product was placed in an air-circulating oven at 115° C. and tested for stability. After 168 hours substantially no loss in weight was observed.

In a preparation wherein the chemically equivalent amount of ferric sulfate in the form of an aqueous solution was employed as the precipitant the weight loss of the dried dimethyl dithiocarbamate at 115° C. in an air-circulating oven was about 14 per cent after 100 hours.

Thus it is evident that by employing less than the chemically equivalent amount of water soluble ferric salt precipitant a more stable product is obtained.

In instances wherein the pure ferric salt is not required, as for example in fungicidal applications, it has been found convenient to precipitate the residual dithiocarbamic acid remaining after the ferric dithiocarbamate precipitation by adding to the aqueous dithiocarbamate solution water-soluble salts of heavy metals such as zinc, copper, lead, mercury, silver, and the like.

As exemplary of this specific embodiment the following is illustrative but in nowise is to be considered as limitative of the invention.

*Example 3*

To a suitable reaction vessel containing substantially 6.3 molecular proportions of sodium dimethyl dithiocarbamate dissolved in approximately 9700 parts by weight of water was added slowly with constant agitation an aqueous solution containing one molecular proportion (substantially 95% of the chemically equivalent amount) of ferric sulfate. Upon completion of the ferric salt addition sufficient zinc sulfate in the form of an aqueous solution was added to precipitate the residual dithiocarbamic acid as zinc dimethyl dithiocarbamate. The combined zinc and ferric dithiocarbamate precipitate was filtered off, washed free of sulfates, and dried at 50° C. A 10.00 gram sample of the dried salt mixture was placed in an air-circulating oven at 115° C. and tested for stability. After 168 hours a weight loss of 0.9 per cent by weight was observed.

Similar results are obtainable employing instead of zinc sulfate such salts as zinc chloride, copper sulfate, lead nitrate, silver nitrate, and the like to precipitate the residual dithiocarbamic acid.

Instead of ferric sulfate other water soluble ferric salts have been employed successfully as precipitating agents, as for example, ferric chloride. Although saturated aqueous solutions of the ferric salt precipitant may be employed, it is preferable to employ more dilute solutions.

Potassium and ammonium dithiocarbamates and like water-soluble dithiocarbamates may be employed in place of sodium dithiocarbamate. Whereas concentrated solutions of the water-soluble dithiocarbamate may be employed, 5–15% by weight solutions are preferred.

While the invention has been described with respect to ferric dimethyl dithiocarbamate, the invention is not so limited. Other dithiocarbamates which may be prepared in a more stable form by the new process are ferric diethyl dithiocarbamate, ferric dibutyl dithiocarbamate, ferric salt of N-2-cyano-ethyl-N-methyl dithiocarbamic acid, ferric salt of N-2-cyano-ethyl-N-ethyl dithiocarbamic acid, ferric salt of N-2-cyano-ethyl-N-butyl dithiocarbamic acid, and ferric salts of analogous and homologous di-aliphatic dithiocarbamic acids disclosed in Marion W. Harman's application Serial No. 598,653, filed June 9, 1945.

What is claimed is:

1. The method of making a ferric salt of an aliphatic dithiocarbamic acid which comprises adding to an aqueous solution of a dithiocarbamate a water soluble ferric salt and discontinuing the addition before an oxidation potential persists as measured by a platinum-saturated calomel electrode, separating the precipitated ferric dithiocarbamate and drying.

2. The method of making a composition consisting principally in a ferric salt of an aliphatic dithiocarbamic acid which comprises adding to an aqueous solution of a dithiocarbamate an aqueous solution of a water-soluble ferric salt containing 90–98% of the ferric ion required to precipitate the total dithiocarbamic acid and then adding a water-soluble salt of a heavy metal selected from the group consisting of zinc, copper, lead, mercury and silver to precipitate the remainder, filtering off the precipitate and drying.

3. The method of making a composition consisting principally in a ferric salt of an aliphatic dithiocarbamic acid which comprises adding to an aqueous solution of a dithiocarbamate an aqueous solution of a water-soluble ferric salt containing 90–98% of the ferric ion required to precipitate the total dithiocarbamic acid and then adding a water-soluble zinc salt to precipitate the remainder, filtering off the precipitate and drying.

4. The method of making a ferric salt of an aliphatic dithiocarbamic acid which comprises adding to an aqueous solution of a dithiocarbamate an aqueous solution of a water-soluble ferric salt and discontinuing the addition before an oxidation potential persists as measured by a platinum-saturated calomel electrode, filtering off the precipitate and drying.

5. The method of making a ferric salt of an aliphatic dithiocarbamic acid which comprises adding to an aqueous solution of a dithiocarbamate an aqueous solution containing 90–98% of the chemically equivalent amount of a water-soluble ferric salt required to combine with the total dithiocarbamic acid, filtering off the precipitate and drying.

6. The method of making ferric dimethyl dithiocarbamate which comprises adding to an aqueous solution of sodium dimethyl dithiocarbamate an aqueous solution of ferric sulfate and discontinuing the addition before an oxidation potential persists as measured by a platinum-saturated calomel electrode, filtering off the precipitate and drying.

7. The method of making ferric dimethyl dithiocarbamate which comprises adding to an aqueous solution of sodium dimethyl dithiocarbamate an aqueous solution containing 90–98% of the chemically equivalent amount of ferric sulfate required to combine with the total dithiocarbamic acid, filtering off the precipitate and drying.

8. The method of making ferric dimethyl dithiocarbamate which comprises adding to an aqueous solution of sodium dimethyl dithiocarbamate an aqueous solution of a ferric salt containing 90–98% of the ferric ion required to precipitate the total dithiocarbamic acid, adding a water soluble zinc salt to complete the precipitation, separating the precipitated dithiocarbamate and drying.

CHARLES J. McKONE.

References Cited in the file of this patent

UNITED STATES PATENTS

| Number | Name | Date |
|---|---|---|
| 1,863,572 | Lommel | June 21, 1932 |
| 2,406,960 | Neal et al. | Sept. 3, 1946 |